United States Patent
Harms et al.

(10) Patent No.: US 11,975,646 B1
(45) Date of Patent: May 7, 2024

(54) REAR BUMPER MOUNTED DOVE TAIL SPRINGS PROVIDING BUILT IN SPRING ASSISTED MOVEMENT FOR EQUIPMENT TRAILER LOADING RAMP

(71) Applicant: Norstar Trailers, LLC, Brookston, TX (US)

(72) Inventors: Johan Harms, Paris, TX (US); Wade Gerritt VanNoord, Reno, TX (US)

(73) Assignee: Norstar Trailers, LLC, Brookston, TX (US)

( * ) Notice: Subject to any disclaimer, the term of this patent is extended or adjusted under 35 U.S.C. 154(b) by 0 days.

(21) Appl. No.: 18/204,843

(22) Filed: Jun. 1, 2023

(51) Int. Cl.
*B60P 1/43* (2006.01)
*F16F 1/12* (2006.01)

(52) U.S. Cl.
CPC ............... *B60P 1/433* (2013.01); *F16F 1/12* (2013.01)

(58) Field of Classification Search
CPC .. B60R 19/48; F16F 1/12; B60P 1/435; B60P 1/433; B60P 1/438; B65G 69/2841
USPC ............................................ 296/61; 293/117
See application file for complete search history.

(56) References Cited

U.S. PATENT DOCUMENTS

| | | | | |
|---|---|---|---|---|
| 5,145,310 A * | 9/1992 | Calzone | ................ | B60P 1/438 14/71.3 |
| 6,860,702 B1 * | 3/2005 | Banks | ..................... | B60P 1/438 414/537 |
| 7,503,612 B1 * | 3/2009 | Taylor | .................... | B60P 1/435 296/61 |
| 9,764,674 B2 * | 9/2017 | Friesen | .................. | B60P 1/438 |
| 10,759,323 B1 | 9/2020 | Harms et al. | | |
| 2002/0081185 A1 * | 6/2002 | Hedtke | ................... | B60P 1/438 414/537 |
| 2008/0178400 A1 * | 7/2008 | Brown | ................... | B60P 1/433 14/71.1 |
| 2017/0334331 A1 * | 11/2017 | Friesen | .................. | B60P 1/438 |
| 2019/0092209 A1 * | 3/2019 | Friesen | .................. | B60P 1/438 |
| 2022/0402419 A1 * | 12/2022 | Magness | ................ | B60P 1/433 |

FOREIGN PATENT DOCUMENTS

GB          2551158 A   * 12/2017   ............ B60P 1/433

* cited by examiner

*Primary Examiner* — Jason S Morrow

(57) ABSTRACT

A spring-assisted trailer loading ramp for an equipment trailer includes a ramp support and at least one ramp rotatably mounted to an end of the ramp support by a spring assist assembly. The spring assist assembly includes: a plurality of pivot tabs mounted to the end of the ramp support, a primary pivot bar received by holes in the plurality of pivot tabs and by first holes in a plurality of hinge plates, at least one primary coil spring on the primary pivot bar configured to act on the ramp support and one of the hinge plates, a secondary pivot bar received by second holes in the plurality of hinge plates and mounted to the at least one ramp, and at least one secondary coil spring on the secondary pivot bar configured to act on the at least one ramp and one of the hinge plates.

6 Claims, 8 Drawing Sheets

REAR BUMPER MOUNTED DOVE TAIL SPRINGS PROVIDING BUILT IN SPRING ASSISTED MOVEMENT FOR EQUIPMENT TRAILER LOADING RAMP

TECHNICAL FIELD

This disclosure relates generally to equipment trailer ramps. More specifically, this disclosure relates to a ramp on trailers for hauling heavy, wheeled equipment.

BACKGROUND

Trailers for hauling wheeled, self-powered equipment frequently include heavy duty ramps for loading and unloading the equipment. Flip-over style equipment ramps are connected by hinges to the rear of the trailer (for example, to a rear bumper), and rotate between resting on a portion of the trailer in a stowed position, for equipment hauling or other trailer movement, and having a surface resting on the ground in a deployed position, for equipment loading and unloading. Since each ramp can weigh several hundred pounds, spring assists are often provided to exert a lifting force on the ramp. When exposed, the springs and or pivot members can be damaged (e.g., bent, or even torn off) and not work correctly.

SUMMARY

A spring assist for trailer loading ramp(s) is "hidden" inside the ramp(s) and a ramp bumper on a ramp support to which the ramp(s) are mounted. The springs and pivot mounts are therefore not exposed, and are less likely to be damaged in a manner inhibiting easy movement of the ramp(s).

In a first embodiment, a spring-assisted trailer loading ramp for an equipment trailer includes a ramp support and at least one ramp rotatably mounted to an end of the ramp support by a spring assist assembly. The spring assist assembly includes: a plurality of pivot tabs mounted to the end of the ramp support, a primary pivot bar received by holes in the plurality of pivot tabs and by first holes in a plurality of hinge plates, at least one primary coil spring on the primary pivot bar configured to act on the ramp support and one of the hinge plates, a secondary pivot bar received by second holes in the plurality of hinge plates and mounted to the at least one ramp, and at least one secondary coil spring on the secondary pivot bar configured to act on the at least one ramp and one of the hinge plates. The trailer loading ramp further includes a ramp bumper over a first portion of the spring assist assembly and a ramp back cover over a second portion of the spring assist assembly.

In some embodiments, the ramp bumper may include slots accommodating rotation of the hinge plates around the primary pivot bar during movement of the at least one ramp between a deployed position and a stowed position.

In some embodiments, a top cover of the at least one ramp may include slots accommodating rotation of the hinge plates around the secondary pivot bar during movement of the at least one ramp between a deployed position and a stowed position.

In some embodiments, the at least one ramp may comprise a plurality of outside gussets, wherein the secondary pivot bar is received by holes in the plurality of outside gussets.

In the preceding embodiment, the at least one ramp may further comprise at least one internal gusset, wherein the secondary pivot bar is received by a hole in the internal gusset.

In some embodiments, an equipment trailer including the trailer loading ramp may include a deck onto which equipment is loaded and secured using the at least one ramp, where the trailer loading ramp is mounted on an end of the deck.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 3A, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Figure 1:
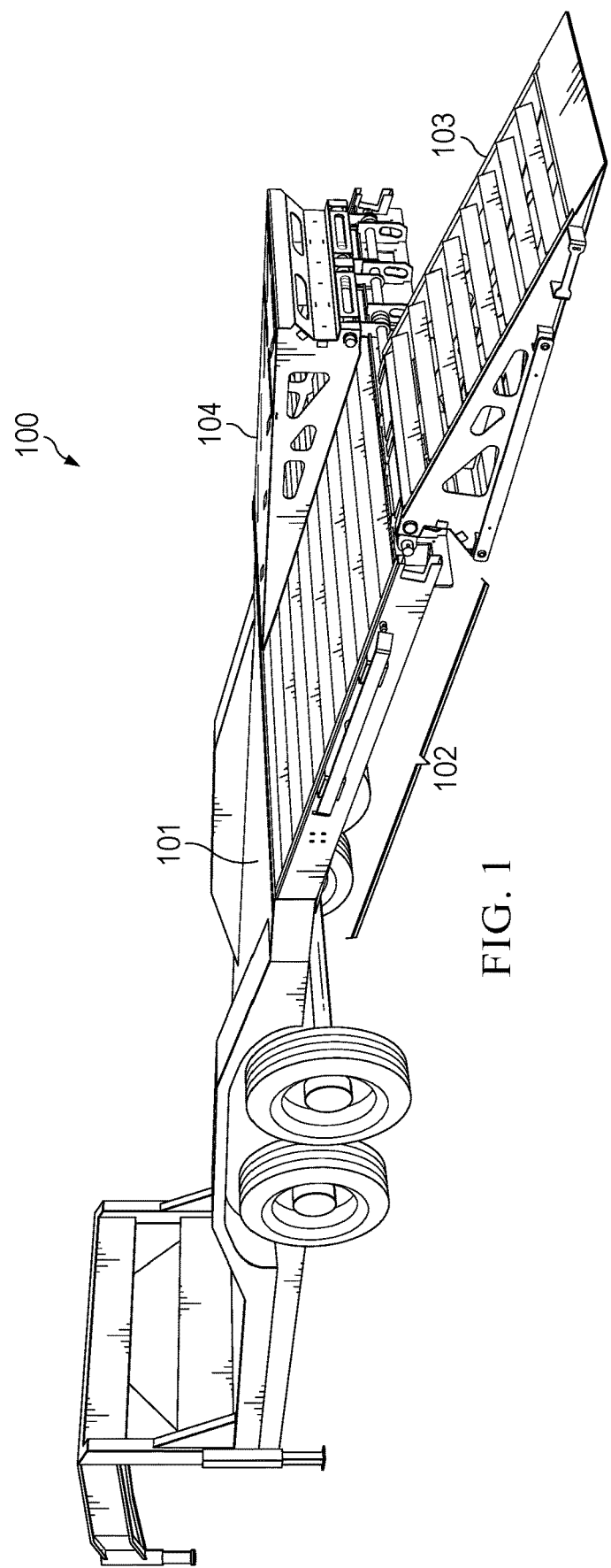
FIG. 1 depicts a perspective view of an equipment trailer having flip over ramps mounted to the end thereof.

FIG. 1 depicts a perspective view of an equipment trailer having flip over ramps mounted to the end thereof. In the example shown, the equipment trailer 100 is a tandem axle, gooseneck trailer having a deck 101 onto which heavy, wheeled, and typically self-driven equipment may be loaded and secured for hauling. At the rear end of the deck 101 is a ramp support 102 to which two flip over ramps 103, 104 are mounted. Ramp 103 is shown in the deployed position in FIG. 1 while ramp 104 is shown in the stowed position. During equipment loading and unloading, both ramps are moved to the deployed position, with at least the end of ramps 103, 104 resting on the ground so that the equipment can be driven onto the trailer up the ramps 103, 104 or off the trailer down the ramps 103, 104. During travel, both ramps are in the stowed position, rotated about the connection to the ramp support 102 and resting on an upper surface of ramp support 102.

Figure 1A:
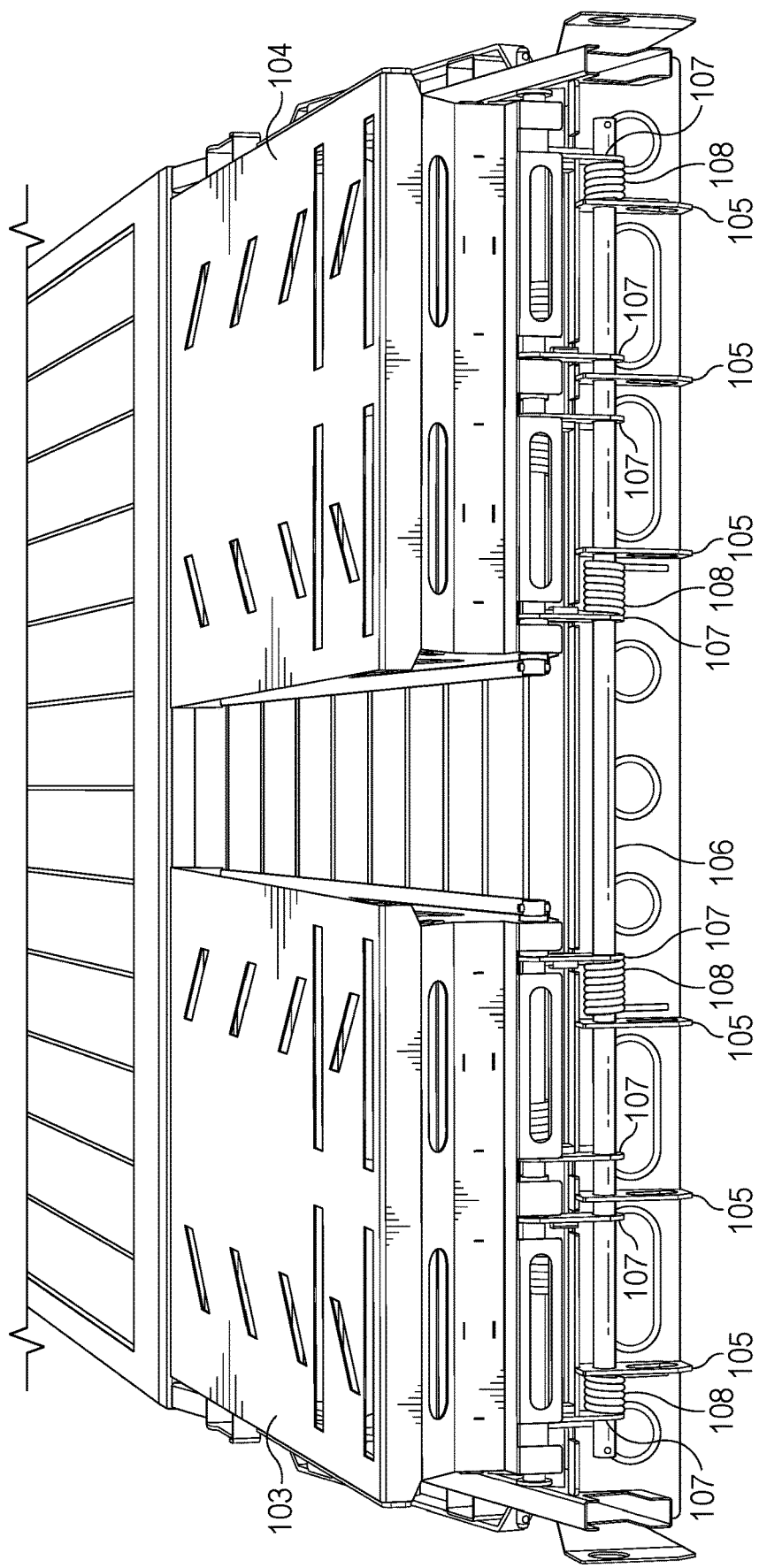
FIG. 1A is an enlarged rear view of the equipment trailer of FIG. 1.

FIG. 1A is an enlarged rear view of the equipment trailer of FIG. 1, illustrating components of the spring assist assemblies for the flip over ramps 103, 104. A plurality of pivot tabs 105 are mounted on a rear surface of the ramp support, with a round pivot bar 106 extending through holes in those pivot tabs 105. The pivot bar 106 also extends through holes in hinge plates 107 on each ramp 103, 104.

Coil springs 108 around the pivot bar 106 each have one end that acts upon the ramp support 102 and one end that acts upon one of the ramps 103, 104, to exert force facilitating movement of the ramp from the stowed position to the deployed position, or vice versa.

Figure 2:
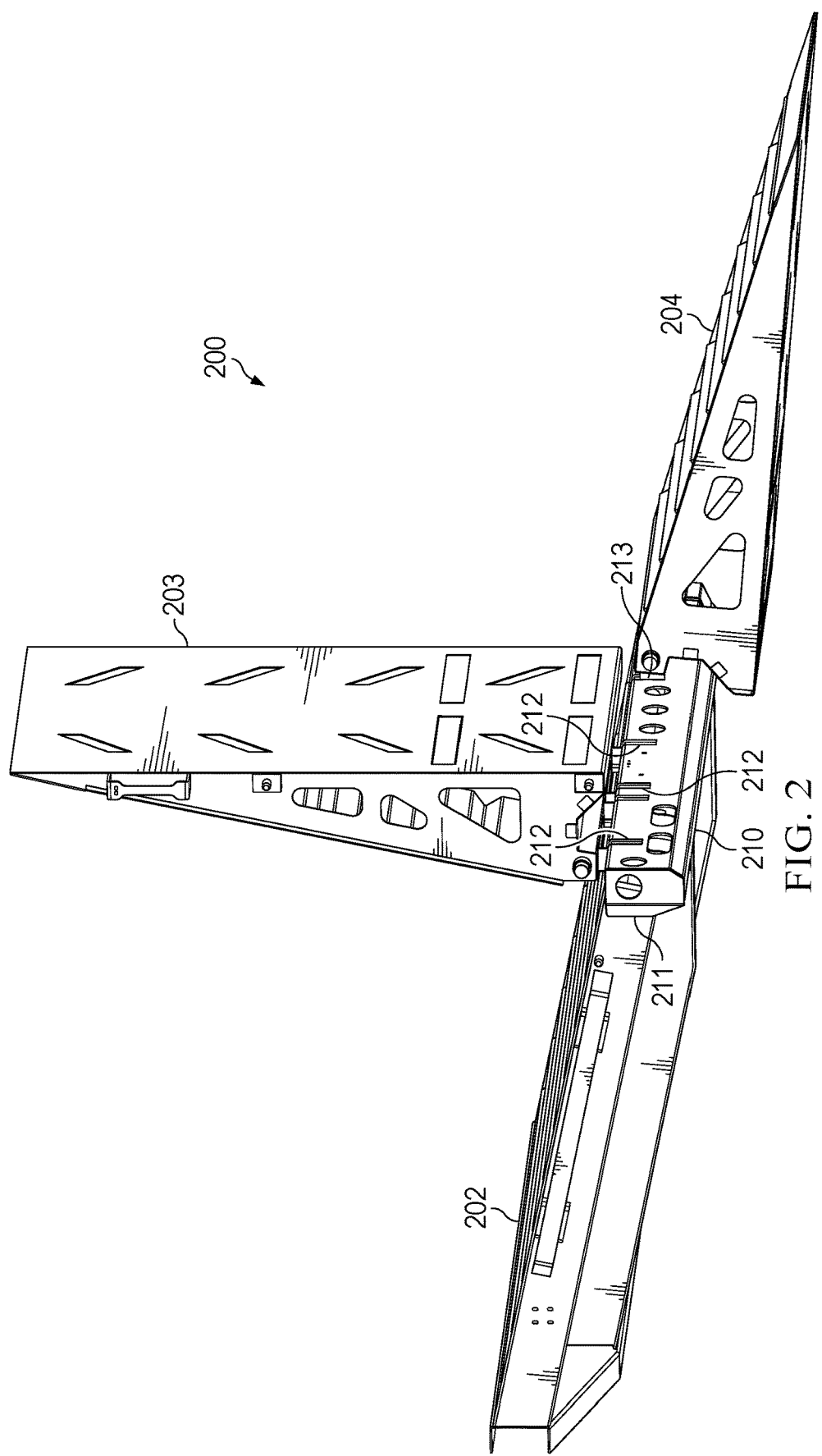
FIG. 2 is a perspective view of a trailer loading ramp with dove tail springs for an equipment trailer according to embodiments of the present disclosure.
Figure 2A:
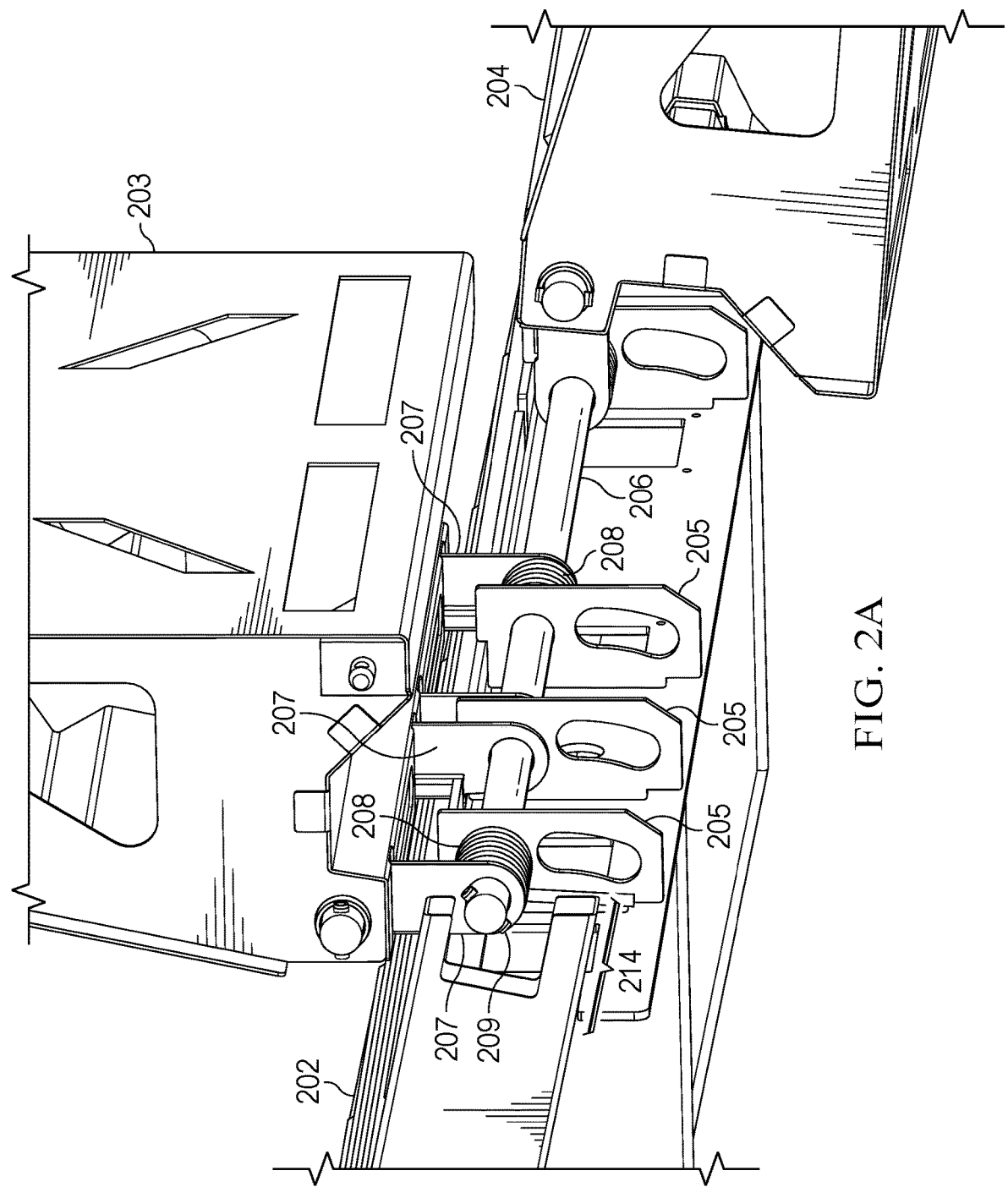
FIGS. 2A through 2C are enlarged views of portions of FIG. 2.
Figure 2B:
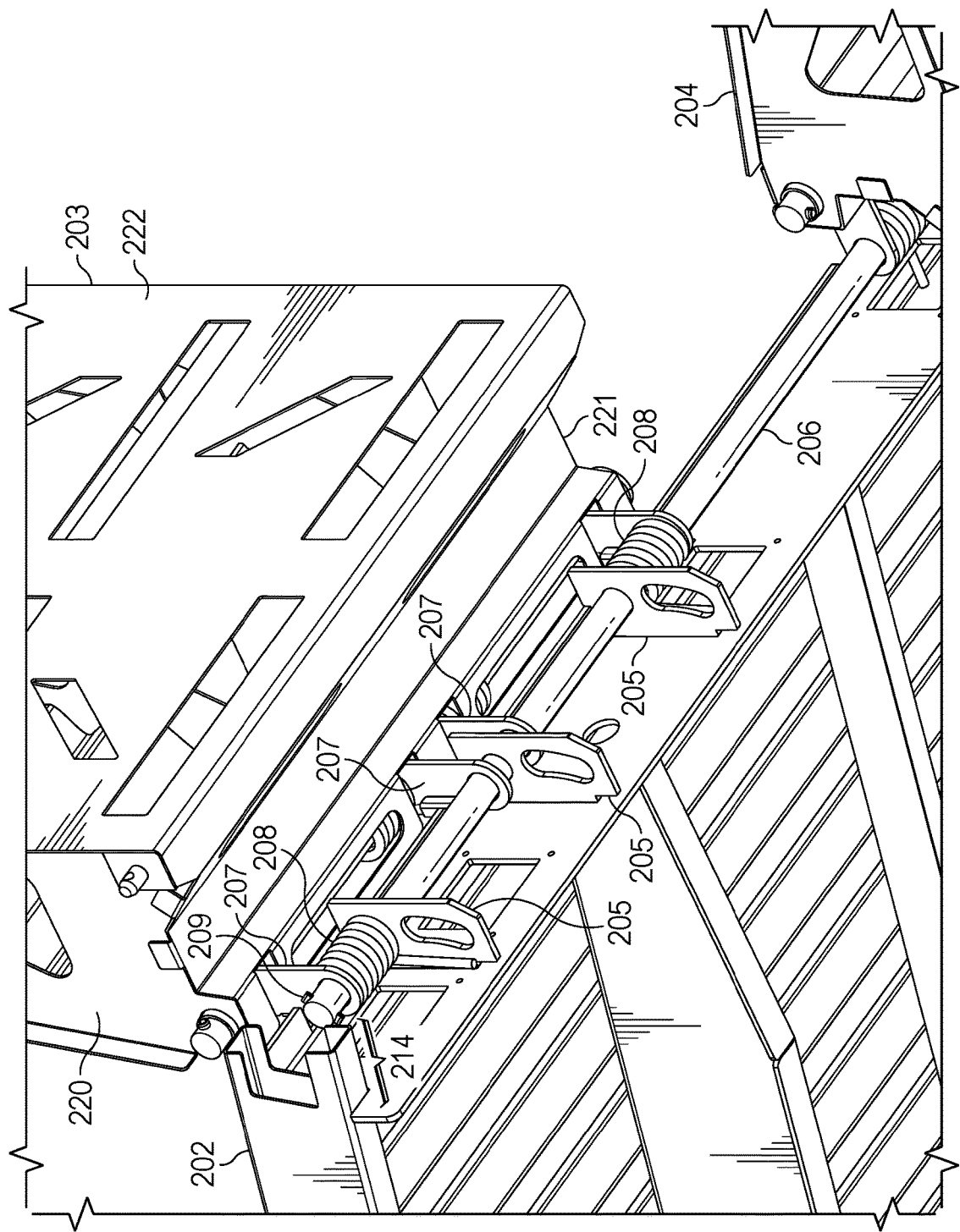
Figure 2C:
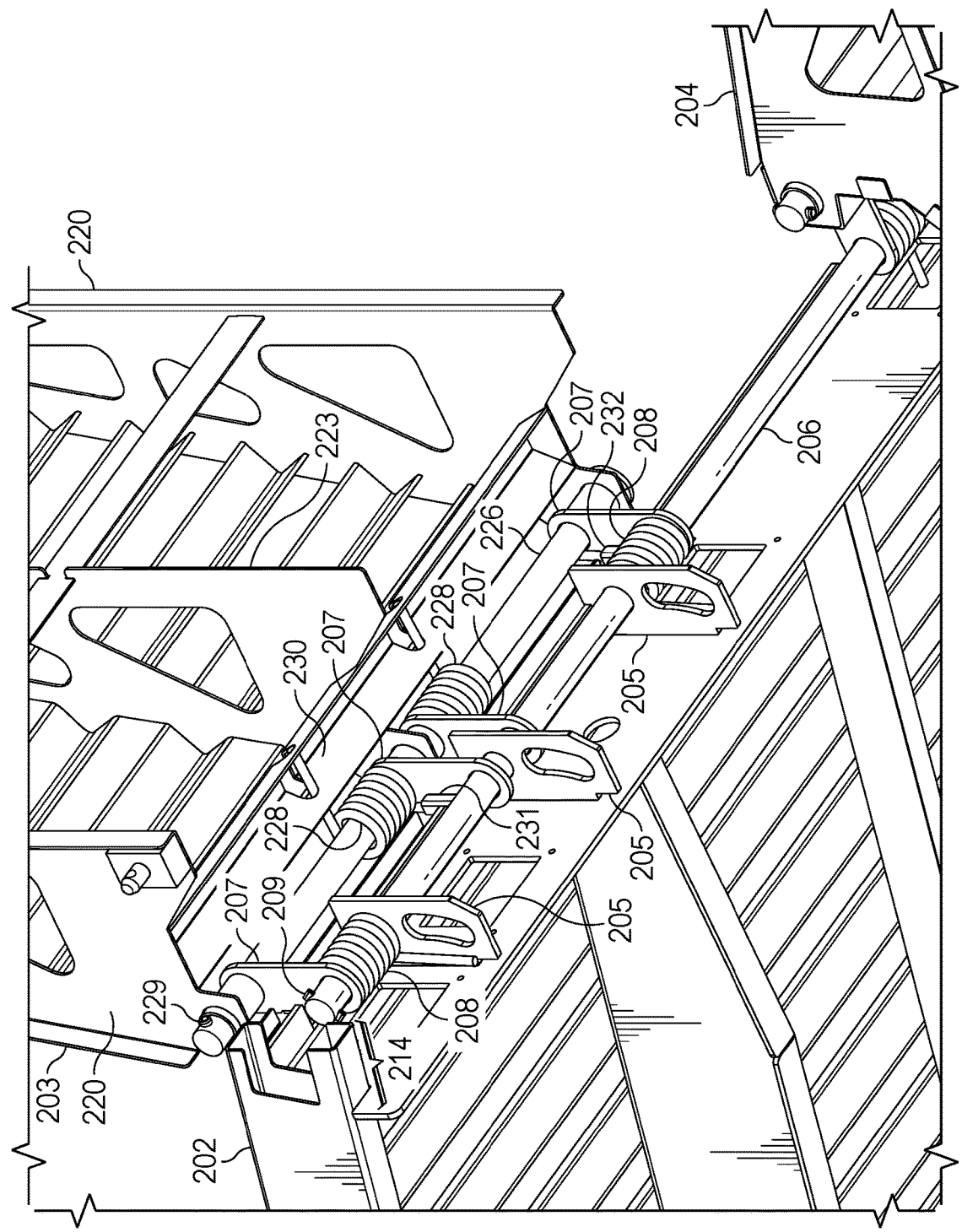

FIG. 2 is a perspective view of a trailer loading ramp with dove tail springs for an equipment trailer according to embodiments of the present disclosure, and FIGS. 2A through 2C are enlarged views of portions of FIG. 2. The embodiment of the trailer loading ramp 200 illustrated in FIGS. 2 and 2A-2C are for illustration only. FIGS. 2 and 2A-2C do not limit the scope of this disclosure to any particular implementation of a trailer loading ramp.

The trailer loading ramp 200 of FIG. 2 includes a ramp support 202 have a rear end to which flip over ramps 203, 204 are rotatably mounted. Ramp 203 is shown in a position approximately halfway between the stowed position and the deployed position, while ramp 204 is in the deployed position in which a bottom surface of ramp 204 will rest on the ground adjacent a rear of the equipment trailer. The front end of ramp support 202 is mounted to a rear end of the equipment trailer, which may have the general configuration shown in FIG. 1.

Ramp support 202 also includes a ramp bumper 210 with end brackets 211 on both ends (only one of which is visible in FIG. 2). Ramp bumper 210 is generally U shaped and extends across an entire width of the rear end of the ramp support 202. Ramp bumper 210 covers and protects the spring assist assemblies for ramps 203, 204. Ramp bumper 210 includes slots 212 accommodating movement of hinge plates mounted on ramps 203, 204, and may optionally include other cutouts or access openings through the surface(s) of ramp bumper 210. For instance, in the example of FIG. 2, ramp bumper 210 includes a cutout 213 near the center thereof. End brackets 211 also cover and protect the spring assist assemblies for ramps 203, 204, and may also serve other functions such as providing a mounting location for lights.

FIG. 2A is an enlarged view of portions of the trailer loading ramp 200 of FIG. 2 with the ramp bumper 210 and end brackets 211 removed. As visible in FIG. 2A, an end portion 214 of a siderail for ramp support 202 provides an attachment point for the ramp bumper 210. The spring assist assembly for ramp 203 includes pivot tabs 205 mounted on the rear surface of the ramp support 202, and a primary pivot bar 206 extending through holes in those pivot tabs 205. The example in FIGS. 2 and 2A includes three pivot tabs 205 spaced along the outermost two-thirds of pivot bar 206 and extending across most of the height of the rear surface of ramp support 202.

Hinge plates 207 connected to ramp 203 also have holes receiving primary pivot bar 206. The example in FIGS. 2 and 2A includes four hinge plates, with the two innermost hinge plates on either side of the center pivot tab and the two outermost hinge plates outside the outermost pivot tabs. Primary coil spring 208 around the primary pivot bar 206 are each positioned between one of the outermost two hinge plates 207. One end of each of primary coil springs 208 acts on the rear surface of the ramp support 202, while the other end acts on one of the hinge plates 207 for the ramp 203. A spring pin 209 retains the primary pivot bar 206 within a limited range of lateral positions in the pivot tabs 205.

FIG. 2B is the enlarged view of FIG. 2A from a different perspective. Ramp 203 includes generally triangular outside gussets 220 (only one of which is clearly visible in FIG. 2B) and a ramp back cover 221 extending therebetween and across most of the height of the rear end of ramp 203. Ramp 203 also includes a deck panel 222 on the bottom thereof. The ramp back cover 221 and the deck panel 222 cover and protect the spring assist assembly for ramp 203.

FIG. 2C is the enlarged view of FIG. 2B from the same perspective as that figure, with the ramp back cover and deck panel removed. Ramp 203 includes a generally triangular middle gusset 223 approximately halfway across the width of the ramp between outer gussets 220. The spring assist assembly for ramp 203 further includes a secondary pivot bar 226 extending through holes in hinge plates 207 that are on the opposite end of each hinge plate 207 from the hole receiving the primary pivot bar 206. The secondary pivot bar 226 is also received by holes in the outer gussets 220 and the middle gusset 223, with portions of the outer gussets 220 receiving the secondary pivot bar 226 positioned outside the two outermost hinge plates 207, and portion of the middle gusset 223 receiving the secondary pivot bar 226 positioned between the two innermost hinge plates 207 in general alignment with the center pivot tab 205. Secondary coil springcoil spring 228 around the secondary pivot bar 226 are positioned outside the two innermost hinge plates 207. One end of each of secondary coil springs 228 acts on the body of the ramp 203, while the other end of each of secondary coil springs 228 acts on one of the hinge plates 207.

Accordingly, one end of each of end of each of secondary coil springs 228 is received by a spring catch channel 230 across the width of the ramp 203, while the other end of each of secondary coil springs 228 is received by a spring channel 231 on one of the hinge plates 207 (with only one of the spring channels 231 visible in FIG. 2C). It should be noted that, similarly, one end of each of primary coil springs 208 is received by a spring channel 232 on one of the hinge plates 207 (with only one of the spring channels 232 visible in FIG. 2C).

Those skilled in the art will understand that the spring assist assembly for ramp 204 is essentially the same as that depicted and described herein for the spring assist assembly for ramp 203. Therefore, for simplicity and clarity, the description of that assembly will be omitted.

Figure 3:
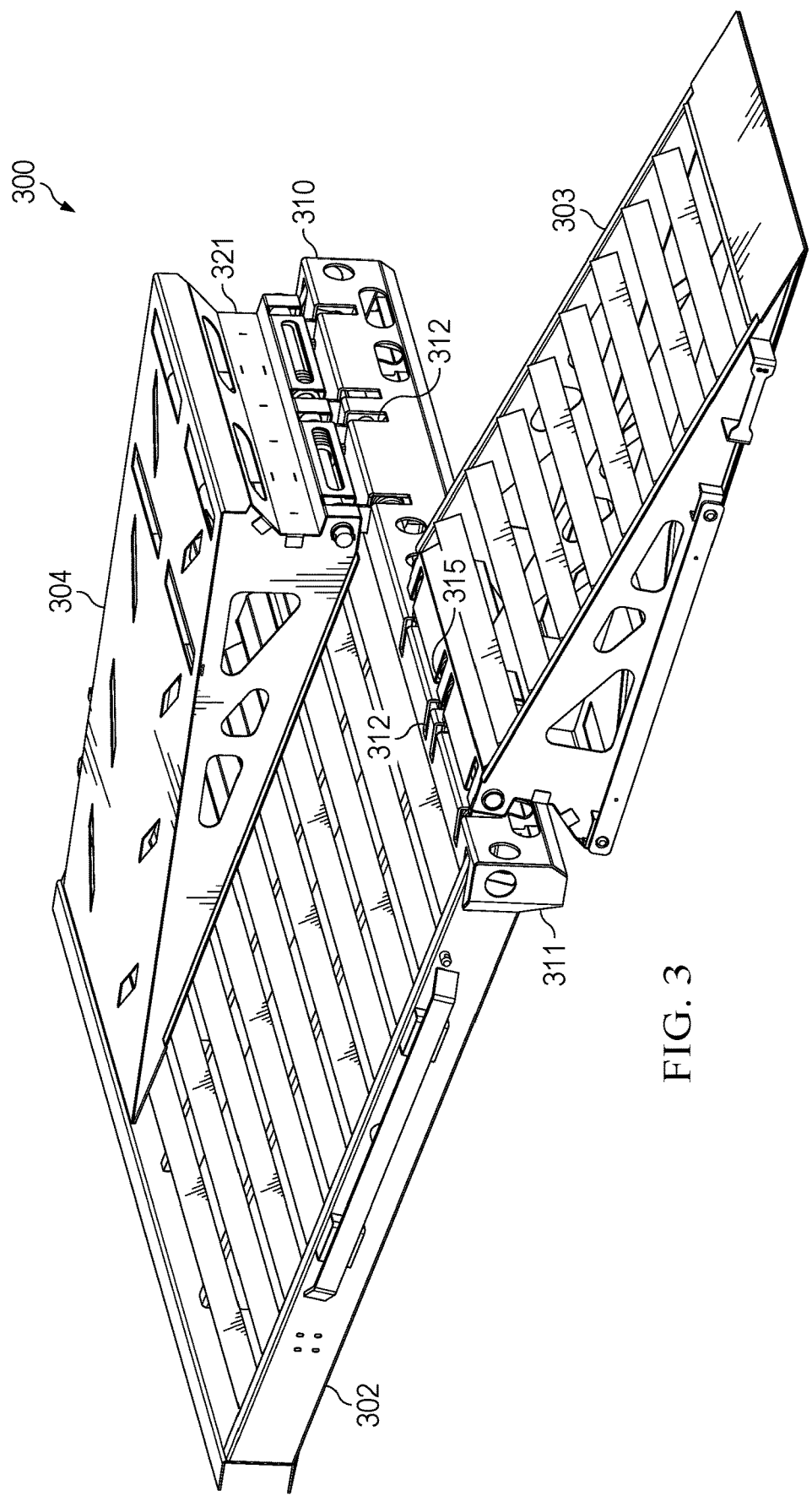
FIG. 3 is a perspective view of a trailer loading ramp with dove tail springs for an equipment trailer according to alternative embodiments of the present disclosure.
Figure 3A:
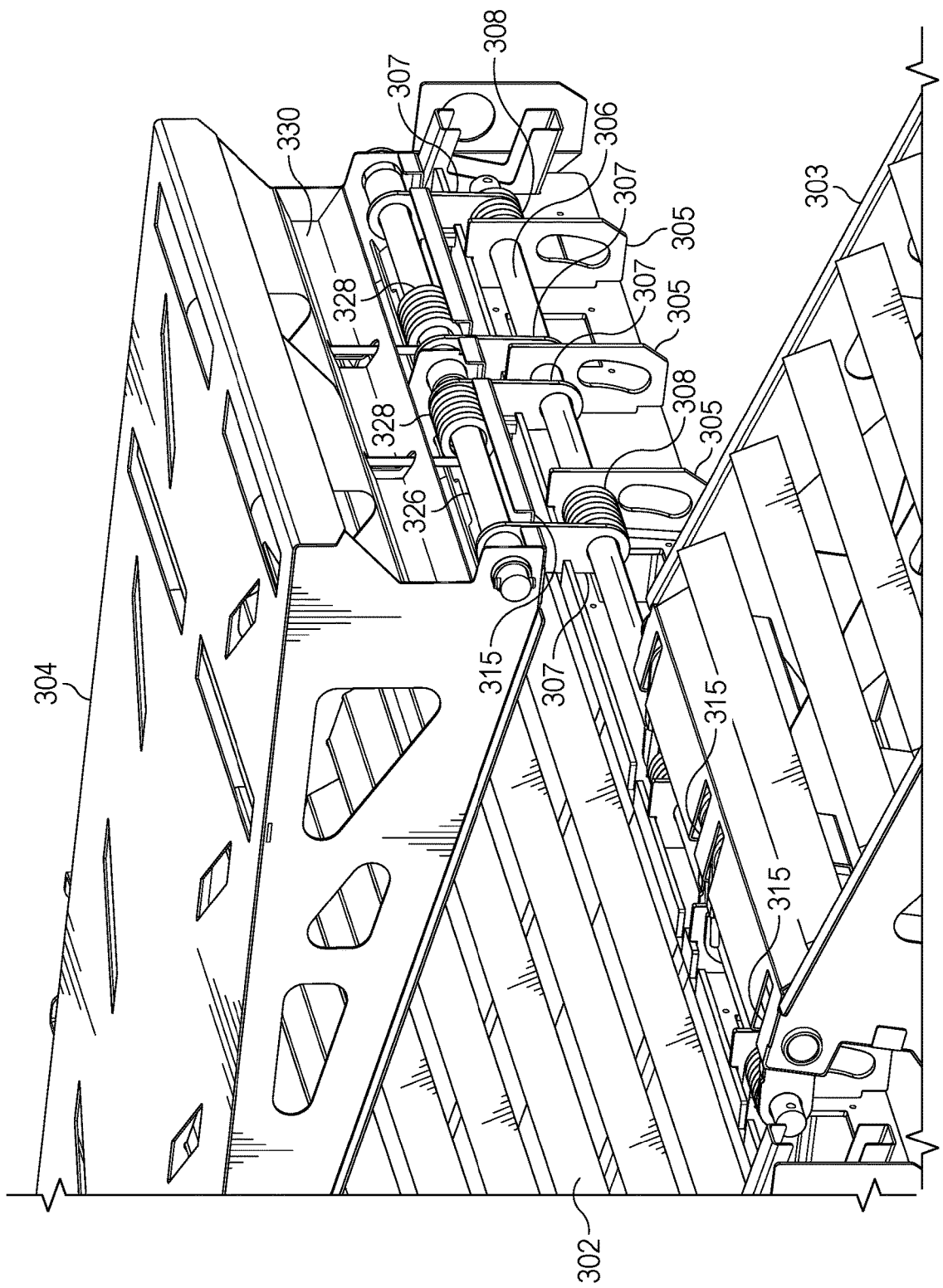
FIG. 3A is an enlarged view of portions of FIG. 3.

FIG. 3 is a perspective view of a trailer loading ramp with dove tail springs for an equipment trailer according to alternative embodiments of the present disclosure, and FIG. 3A is an enlarged view of portions of FIG. 3. The embodiment of the trailer loading ramp 300 illustrated in FIGS. 3 and 3A are for illustration only. FIGS. 3 and 3A do not limit the scope of this disclosure to any particular implementation of a trailer loading ramp.

As with the embodiment of FIGS. 2 and 2A-2C, the trailer loading ramp 300 of FIG. 3 includes a ramp support 302 have a rear end to which flip over ramps 303, 304 are rotatably mounted. Ramp 303 is shown in the deployed position, while ramp 304 is in the stowed position. The front end of ramp support 302 is mounted to a rear end of the equipment trailer, which may have the general configuration shown in FIG. 1.

Ramp support 302 also includes a ramp bumper 310 with end brackets 311 on both ends (only one of which is visible in FIG. 3). Ramp bumper 310 and end brackets 311 cover and protect the spring assist assemblies for ramps 303, 304. Ramp bumper 310 includes slots 312 accommodating movement of hinge plates mounted on ramps 303, 304. Ramp 304 includes a ramp back cover 321 extending across the width and most of the height of the rear end of ramp 304.

FIG. 3A is an enlarged view of portions of the trailer loading ramp 300 of FIG. 3 with the ramp bumper 310 and ramp back cover 321 (but not end brackets 311) removed. Trailer loading ramp 300 includes pivot tabs 305 mounted on the rear surface of the ramp support 302 and a primary pivot bar 306 extending through holes in those pivot tabs 305 and in hinge plates 307. Primary coil springs 308 around the primary pivot bar 306 each have one end acting on the rear surface of the ramp support 302, while the other end acts on one of the hinge plates 307. Hinge plates 307 also receive a secondary pivot bar 326 on which secondary coil springs 228 are mounted.

One feature visible in FIGS. 3 and 3A that is not visible in FIGS. 2 and 2A-2C is that the ramp top covers for ramps 303, 304 also include slots 315 accommodating movement of hinge plates 307 on ramps 303, 304. In addition, FIGS. 3 and 3A collectively illustrate that ends of secondary coil springs 328 may extend through holes in ramp back cover 321, rather than being received by spring catch channel 330.

The primary coil springs 208, 308 and secondary coil springs 228, 328 for trailer loading ramps 200, 300 are preferably mounted such that the springs exert force assisting movement of the ramps 203, 204 and 303, 304 from either the stowed position to the deployed position or vice versa, with minimal force exerted when the respective ramp 203, 204, 303, or 304 is approximately halfway between the stowed and deployed positions. This may be achieved, for example, by having either one of the primary coil springs 208, 308 or secondary coil springs 228, 328 exert force biasing the ramp toward movement away from the deployed position, and the other of the primary coil springs 208, 308 or secondary coil springs 228, 328 exert force biasing the ramp toward movement away from the stowed position. That is, one set assists in picking the ramp up from the deployed (or "open") position, while the other set assists in picking the ramp up from the stowed (or "closed") position.

Preferably, the primary coil springs 208, 308 and the secondary coil springs 228, 328 are configured so that the end of ramps 203, 204, 303, and 304 will, when in the deployed position, are not resting on the ground adjacent the equipment trailer. Instead, the bottom of the respective ramp is suspended slightly above the ground.

While the functionality of the spring assist of the present disclosure is similar to that of the design described in connection with FIGS. 1 and 1A, the design of the present disclosure covers and protects (or "conceals") functional pieces of the spring assist. In the exemplary embodiments, the primary (or "bottom") coil springs 208, 308 are "hidden" inside the ramp bumper, while the secondary (or "top") coil springs 228, 328 are "hidden" inside the respective ramp. As a result, the coils springs are not exposed, and the supports for the pivot bar(s) do not hang down below the trailer, such that damage (e.g., from backing into an object) is less likely to result is degradation of the effectiveness of the spring assist.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A trailer loading ramp, comprising:
    a ramp support;
    at least one ramp rotatably mounted to an end of the ramp support by a spring assist assembly including:
        a plurality of pivot tabs mounted to the end of the ramp support,
        a primary pivot bar received by holes in the plurality of pivot tabs and by first holes in a plurality of hinge plates,
        at least one primary coil spring on the primary pivot bar configured to act on the ramp support and one of the hinge plates,
        a secondary pivot bar received by second holes in the plurality of hinge plates and mounted to the at least one ramp, and
        at least one secondary coil spring on the secondary pivot bar configured to act on the at least one ramp and one of the hinge plates;
    a ramp bumper over the pivot tabs and covering the at least one primary coil spring; and
    a ramp back cover extending across a width and at least a portion of a height of a ramp secured to the ramp support over the at least one secondary coil spring.

2. A trailer loading ramp comprising:
    a ramp support:
    at least one ramp rotatably mounted to an end of the ramp support by a spring assist assembly including:
        a plurality of pivot tabs mounted to the end of the ramp support,
        a primary pivot bar received by holes in the plurality of pivot tabs and by first holes in a plurality of hinge plates,
        at least one primary coil spring on the primary pivot bar configured to act on the ramp support and one of the hinge plates;
        a secondary Divot bar received by second holes in the plurality of hinge plates and mounted to the at least one ramp, and
        at least one secondary coil spring on the secondary Divot bar configured to act on the at least one ramp and one of the hinge plates;
    a ramp bumper over a first portion of the spring assist assembly, wherein the ramp bumper includes slots accommodating rotation of the hinge plates around the primary pivot bar during movement of the at least one ramp between a deployed position and a stowed position;

a ramp back cover over a second portion of the spring assist assembly.

3. A trailer loading ramp, comprising:

a ramp support:

at least one ramp rotatably mounted to an end of the ramp support by a spring assist assembly including:
- a plurality of pivot tabs mounted to the end of the ramp support,
- a primary pivot bar received by holes in the plurality of pivot tabs and by first holes in a plurality of hinge plates,
- at least one primary coil spring on the primary pivot bar configured to act on the ramp support and one of the hinge plates;
- a secondary pivot bar received by second holes in the plurality of hinge plates and mounted to the at least one ramp, and
- at least one secondary coil spring on the secondary pivot bar configured to act on the at least one ramp and one of the hinge plates;

a ramp bumper over a first portion of the spring assist assembly:

a ramp back cover over a second portion of the spring assist assembly; and a top cover of the at least one ramp includes slots accommodating rotation of the hinge plates around the secondary pivot bar during movement of the at least one ramp between a deployed position and a stowed position.

4. The trailer loading ramp of claim 1, wherein the at least one ramp comprises a plurality of outside gussets, wherein the secondary pivot bar is received by holes in the plurality of outside gussets.

5. The trailer loading ramp of claim 4, wherein the at least one ramp further comprises at least one internal gusset, wherein the secondary pivot bar is received by a hole in the internal gusset.

6. An equipment trailer including the trailer loading ramp of claim 1, the equipment trailer comprising:
- a deck onto which equipment is loaded and secured using the at least one ramp, wherein the trailer loading ramp is mounted on an end of the deck.

\* \* \* \* \*